United States Patent
Moehrle et al.

(10) Patent No.: US 12,532,056 B2
(45) Date of Patent: Jan. 20, 2026

(54) IMAGER MODULE FOR A CAMERA OR A SENSOR

(71) Applicant: Robert Bosch GmbH, Stuttgart (DE)

(72) Inventors: Andreas Moehrle, Stuttgart (DE); Moritz Winkler, Waldbronn (DE); Nikolai Bauer, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 18/556,002

(22) PCT Filed: Aug. 2, 2022

(86) PCT No.: PCT/EP2022/071654
§ 371 (c)(1),
(2) Date: Oct. 18, 2023

(87) PCT Pub. No.: WO2023/041243
PCT Pub. Date: Mar. 23, 2023

(65) Prior Publication Data
US 2024/0388780 A1  Nov. 21, 2024

(30) Foreign Application Priority Data
Sep. 17, 2021 (DE) .............. 10 2021 210 307.3

(51) Int. Cl.
*H04N 23/52* (2023.01)
*H04N 23/51* (2023.01)
(Continued)

(52) U.S. Cl.
CPC ............. *H04N 23/52* (2023.01); *H04N 23/51* (2023.01); *H04N 23/54* (2023.01); *H04N 23/55* (2023.01)

(58) Field of Classification Search
CPC ........ H04N 23/51; H04N 23/52; H04N 23/54; H04N 23/55; H04N 23/57
See application file for complete search history.

(56) References Cited

U.S. PATENT DOCUMENTS

| 11,635,672 B2* | 4/2023 | Sesti ............... H04N 23/57 396/529 |
| 2015/0002737 A1* | 1/2015 | Steinberger ........ H04N 23/57 348/374 |

(Continued)

FOREIGN PATENT DOCUMENTS

| DE | 102019200061 A1 | 7/2020 |
| DE | 102019213798 A1 | 3/2021 |

(Continued)

OTHER PUBLICATIONS

International Search Report for PCT/EP2022/071654, Issued Nov. 3, 2022.

*Primary Examiner* — Amy R Hsu
(74) *Attorney, Agent, or Firm* — Norton Rose Fulbright US LLP

(57) ABSTRACT

An imager module for a camera or a sensor. The imager module includes a housing, a sensor carrier which is fixedly connected to the housing and on which an image sensor is arranged, an objective, and a holding element via which the objective is held and is aligned with respect to the image sensor. The holding element is arranged outside the housing and bridges a radial gap between the objective and the housing. The holding element is welded to the objective and/or to the housing.

13 Claims, 5 Drawing Sheets

(51) Int. Cl.
*H04N 23/54* (2023.01)
*H04N 23/55* (2023.01)

(56) References Cited

U.S. PATENT DOCUMENTS

2021/0072621 A1\* 3/2021 Faridian .................. G03B 17/12
2022/0345595 A1\* 10/2022 Bauer .................... G03B 17/12

FOREIGN PATENT DOCUMENTS

| DE | 102019216287 A1 | 4/2021 |
| EP | 3516859 B1 | 8/2021 |
| JP | 2010107544 A | 5/2010 |

\* cited by examiner

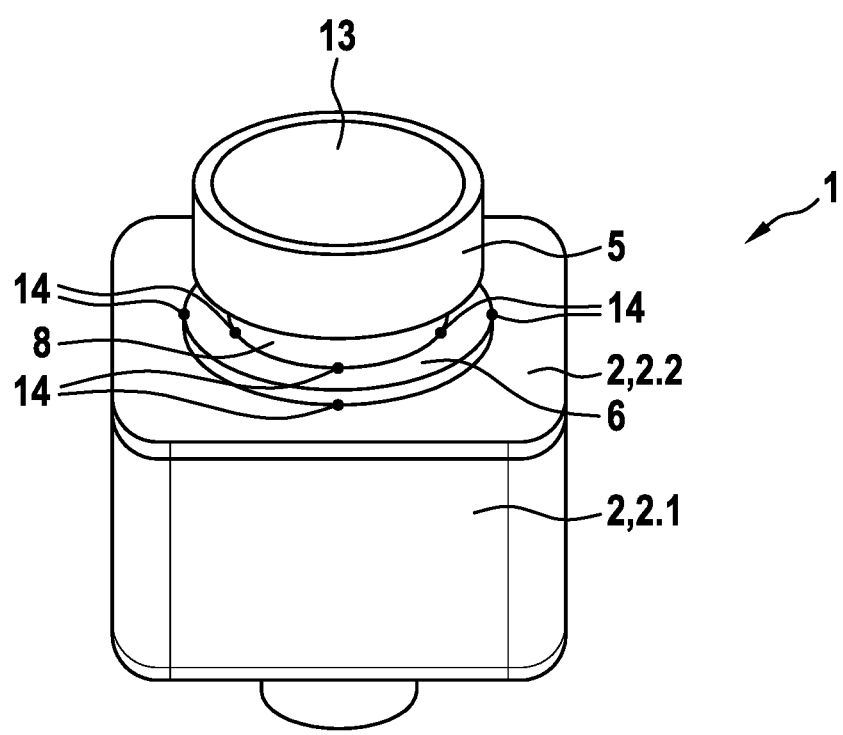

IMAGER MODULE FOR A CAMERA OR A SENSOR

FIELD

The present invention relates to an imager module for a camera or a sensor.

The preferred area of application of the camera or of the sensor are video-based driver assistance systems, industrial and/or safety-related camera applications, and consumer goods, for example smartphones and tablets.

BACKGROUND INFORMATION

An imager module for a camera or a sensor usually comprises an image sensor arranged on a sensor carrier and an objective with at least one optical lens. Since an axial distance between the objective and the image sensor has to be bridged and the objective has to be aligned with respect to the image sensor, a holding device can be provided between the objective and the image sensor, which holding device is glued to the objective on one side and to the sensor carrier on the other side in order to fix the focused position.

Such an arrangement is described, by way of example, in German Patent Application No. DE 10 2019 200 061 A1, which describes an image acquisition device with an objective element group. The objective element group has a lens tube with at least one lens accommodated therein, wherein the lens tube is accommodated in a holding device of the image acquisition device, which has a first holding-gluing region for gluing to a sensor carrier and a second holding-gluing region for gluing to the lens tube.

However, adhesive connections have the disadvantage that they tend to swell under the influence of temperature and/or moisture, so that the set focal position is at risk. Moreover, adhesives change due to aging of their properties. This can likewise result in defocusing.

An object of the present invention is to provide an imager module for a camera or a sensor, which image module has as stable a focal position as possible even under the influence of temperature and/or moisture. In addition, the imager module should be producible as simply and thus cost-effectively as possible.

An imager module having features of the present invention may achieve the object. Advantageous developments of the present invention are disclosed herein.

SUMMARY

According to an example embodiment of the present invention, an imager module is provided for a camera or a sensor comprises a preferably multipart housing, a sensor carrier which is fixedly connected to the housing and on which an image sensor is arranged, an objective and a holding element. Via the holding element, the objective is held and aligned with respect to the image sensor. The holding element is arranged outside the housing and bridges a radial gap between the objective and the housing. Furthermore, the holding element is welded, preferably spot-welded, to the objective and/or to the housing.

According to an example embodiment of the present invention, in the imager module, the usually provided glued connection between the objective and the holding element and/or between the holding element and the housing is accordingly replaced by a welded connection. In contrast to the glued connection, the welded connection can achieve a stable focal position even under the influence of temperature and/or moisture. The welded connection is therefore particularly robust. Accordingly, the robustness of the imager module and thus its lifetime increases.

Due to these advantages, the holding element is preferably welded both to the objective and to the housing. Before welding the holding element to the objective or to the housing, depending on the order of assembly, the objective can be aligned with respect to the image sensor and subsequently be fixed by creating the weld seam. Preferably, weld seams or welding spots are created only at selected points, so that the heat input during welding is minimal.

According to an example embodiment of the present invention, the welded connection is preferably produced by means of a laser, so that it is a laser-welded connection. The laser can create individual welding spots in a targeted manner.

The holding element is preferably manufactured from metal. As a result, the weldability of the holding element is ensured. Furthermore, the holding element is preferably manufactured from a metal sheet, since this enables particularly cost-effective production of the holding element as a simple punched part.

Moreover, according to an example embodiment of the present invention, it is provided that the objective has, at least in a portion surrounded by the holding element, a metal outer contour for welding to the holding element. The metal outer contour not only ensures the weldability of the objective but, due to the high strength of metal, at the same time also optimally protects the optics accommodated in the objective against external influences. The portion of the objective surrounding the holding element can in particular be cylindrical or substantially cylindrical. For example, the metal outer contour provided for welding to the holding element can have at least one flattened portion, so that a particular angular position of the objective with respect to the housing can be specified thereby. For example, three flattened portions arranged at the same angular distance from one another can be provided.

According to an example embodiment of the present invention, the holding element is preferably designed as a ring or disk with a central hole for accommodating the objective. The holding element can accordingly have a very simple geometry which can be produced particularly simply and cost-effectively, for example by punching it out of a metal sheet. The design as a disk has the advantage that even larger radial gaps between the objective and the housing can be bridged by means of the holding element. The disk thus allows improved tolerance compensation.

According to an example embodiment of the present invention, the central hole of the holding element advantageously has an inner contour adapted to the outer contour of the objective. This applies in particular if the outer contour of the objective is provided with at least one flattened portion. The holding element can thus be closely connected to the objective.

According to an example embodiment of the present invention, during the assembly of the imager module, the holding element is preferably first welded to the objective and inserted together with the objective into the housing in such a way that the holding element comes to lie against the outside of the housing. After the objective has been aligned, the holding element can then be welded to the housing, so that the focal position of the objective is fixed.

In order to ensure the weldability of the holding element to the housing, it is provided according to an example embodiment of the present invention, that the housing is manufactured at least partially from metal. This measure furthermore contributes to the housing being particularly robust, so that the components accommodated therein are particularly well protected against external influences.

According to a preferred embodiment of the present invention, the housing comprises at least a first housing part for accommodating the sensor carrier and the image sensor, and a second housing part designed as a cover. The multipart design of the housing facilitates the assembly of the imager module. This is because the sensor carrier, including the image sensor, can first be inserted into the housing and connected thereto. The housing can subsequently be closed by means of the cover. The objective, preferably together with the holding element, is installed last, wherein the objective is aligned with respect to the image sensor. The objective can then be fixed with respect to the housing via the external holding element.

According to an example embodiment of the present invention, the first and the second housing part are preferably connected in a firmly-bonded and/or positive manner. For a firmly bonded connection, the two housing parts can be glued to one another, for example. In this way, sealing of the contact region of the two housing parts is achieved at the same time. For a positive connection, the contact region can have a rabbet via which the two housing parts engage in one another.

According to an example embodiment of the present invention, in order to be able to insert the objective into the housing, the second housing part designed as a cover preferably has a hole. The radial gap to be bridged by the holding element is located within this hole. The inner diameter of the hole is therefore smaller than the outer diameter of the holding element.

Preferably, according to an example embodiment of the present invention, the second housing part designed as a cover has a collar delimiting the radial gap. The collar increases the dimension of the radial gap in the axial direction. Preferably, the collar extends into the housing, so that the holding element abutting against the outside of the second housing part is not hindered by the collar.

According to an example embodiment of the present invention, a seal is advantageously accommodated in the radial gap. Sealing of the housing in the region of the radial gap is achieved by means of the seal. In this case, the holding element bridging the radial gap does not have to have a sealing function, so that it can be welded to the objective and/or to the housing only at selected points.

For securing the position, the seal can be accommodated in a circumferential annular groove of the objective. The seal is then installed together with the objective. When the objective is inserted into the hole of the second housing part designed as a cover, the seal is then preferably radially preloaded. Preferably, the collar of the second housing part comes to abut against the seal in the process. The collar then compensates for any manufacturing and/or installation tolerances.

The objective preferably has at least one optical lens which forms the optics. A plurality of optical lenses can be combined, for example in the form of a lens package. The latter can be preassembled and inserted as a unit into the objective, so that the assembly is further simplified.

Preferred embodiments of the present invention are explained in more detail below with reference to the figures.

BRIEF DESCRIPTION OF THE DRAWINGS

FIG. 5 shows a perspective view of the imager module of FIG. 1, with indication of the welding spots.

DETAILED DESCRIPTION OF EXAMPLE EMBODIMENTS

Figure 1:
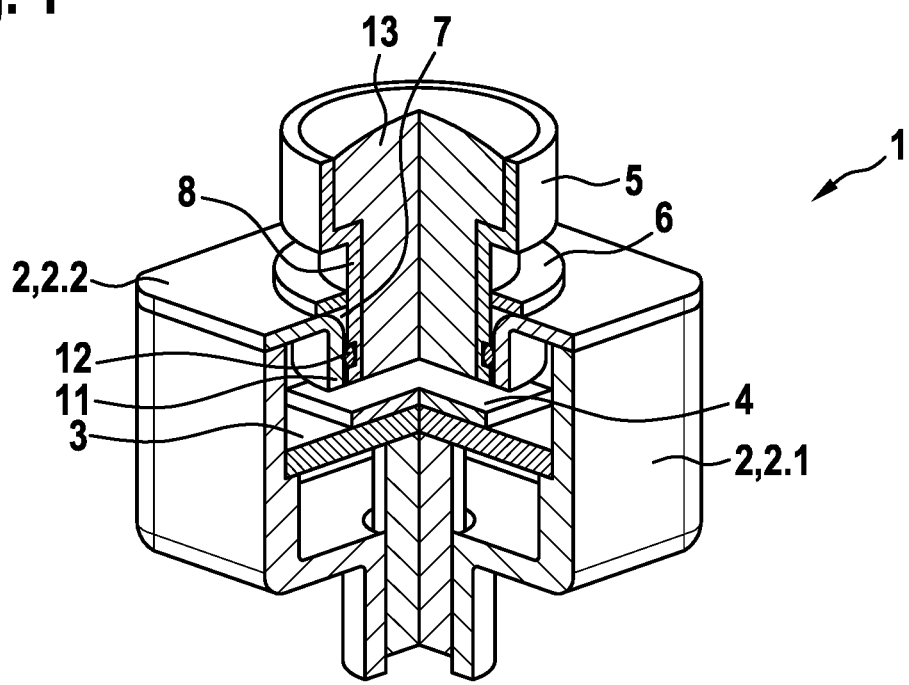
FIG. 1 shows a sectional perspective view of an imager module according to a first preferred embodiment of the present invention.

FIG. 1 shows a first preferred embodiment of an imager module 1 according to the present invention. Said module comprises a housing 2 with a first housing part 2.1 and a second housing part 2.2. A sensor carrier 3 with an image sensor 4 arranged thereon is inserted into the first housing part 2.1. An objective 5 with at least one lens 13, preferably in the form of a lens package, is arranged above the image sensor 4 and is aligned with respect to the image sensor 4. The objective 5 is held and fixed by a holding element 6, which is arranged outside the housing 2 and bridges a radial gap 7 between the objective 5 and the housing 2.

Figure 2:
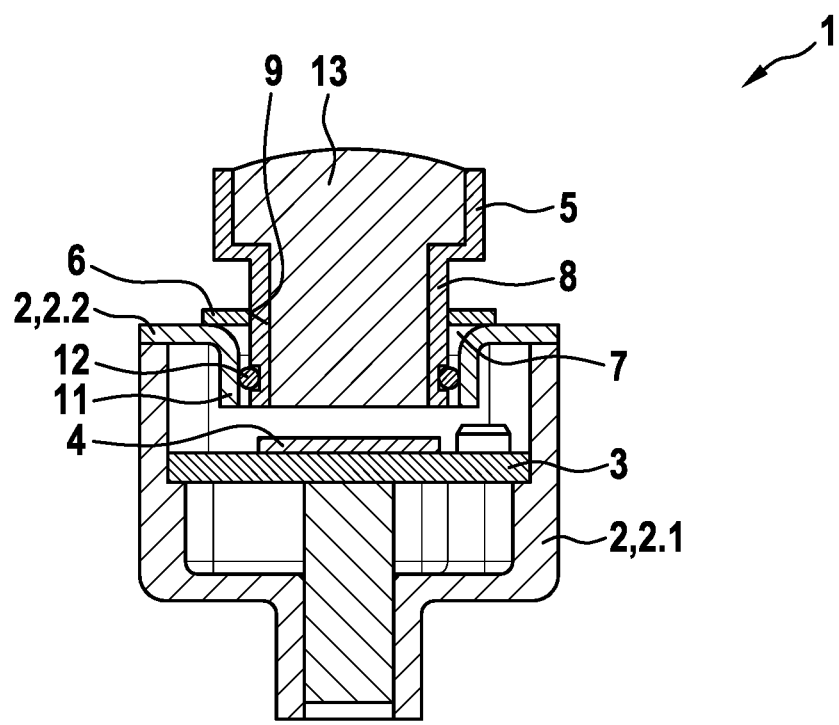
FIG. 2 shows a longitudinal section through the imager module of FIG. 1.

As can be seen in particular in FIG. 2, the radial gap 7 is delimited on the housing side by a collar 11 of the second housing part 2.2 designed as a cover. A seal 12 abuts against the collar 11 under a radial preload and is supported at the other end on the objective 5, so that the radial gap 7 is sealed.

Figure 3:
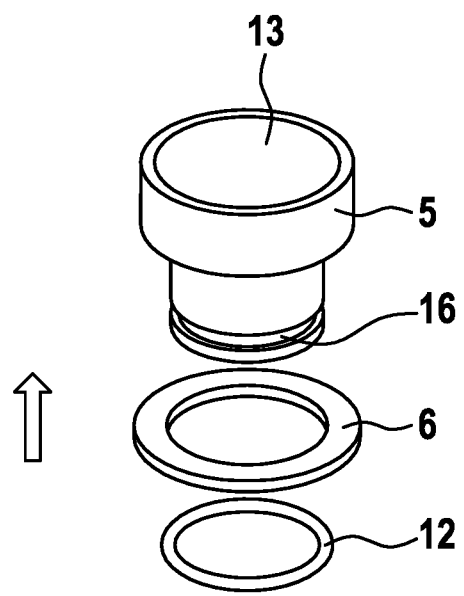
FIG. 3 shows an exploded view of the parts of the imager module of FIG. 1 to be connected before the installation of the objective.

During the production of the imager module 1 of FIG. 1, the objective 5 is first connected to the holding element 6 and the seal 12 (see FIG. 3). For fixing the position of the sealing ring 12, the objective 5 has a circumferential annular groove 16 accommodating the seal 12, so that the seal 12 is connected to the objective 5 not only non-positively but also positively. The sealing ring 12 also holds the holding element 6 on the objective 5. A rigid connection between the holding element 6 and the objective 5 is preferably produced only after the objective 5 has been inserted into the housing 2 and the objective 5 has been aligned with respect to the image sensor 4.

Figure 4:
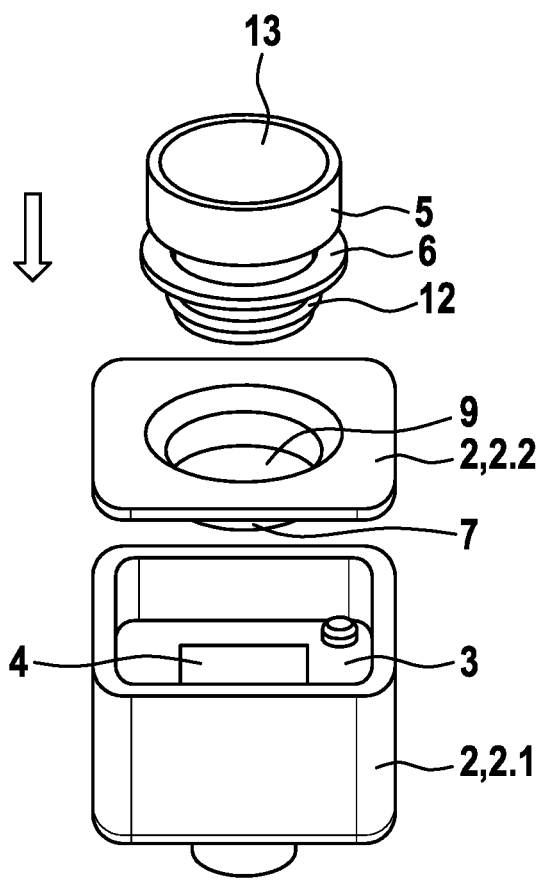
FIG. 4 shows an exploded view of the preassembled parts of FIG. 3 with further parts of the imager module of FIG. 1 to be connected.

As can be seen in FIG. 4, before the objective 5 is installed, the sensor carrier 3 and the image sensor 4 are inserted into the housing 2, namely into the first housing part 2.1. The second housing part 2.2 designed as a cover is then placed onto the first housing part 2.1 and connected in a firmly-bonded and/or positive manner, in particular glued, to the first housing part 2.1. Subsequently, the preassembled unit consisting of the objective 5, the holding element 6, and the seal 12 can be inserted into the second housing part 2.2 designed as a cover, which has a hole 9 for this purpose. The hole 9 is delimited by the collar 11 against which the seal 12 comes to abut. On the outside, the radial gap 7 between the objective 5 and the housing 2 is covered by the holding element 6. Since the holding element 6 is fixed neither to the objective 5 nor to the housing 2, the objective 5 can be aligned multiaxially with respect to the image sensor 4 during the assembly. Only when the focal position of the objective 5 has been established is the holding element 6 permanently fixed to the objective 5 and to the housing 2. The fixing can in particular be achieved by means of individual welding spots 14 which are preferably arranged distributed uniformly over the circumference (see FIG. 5).

Figure 6A:
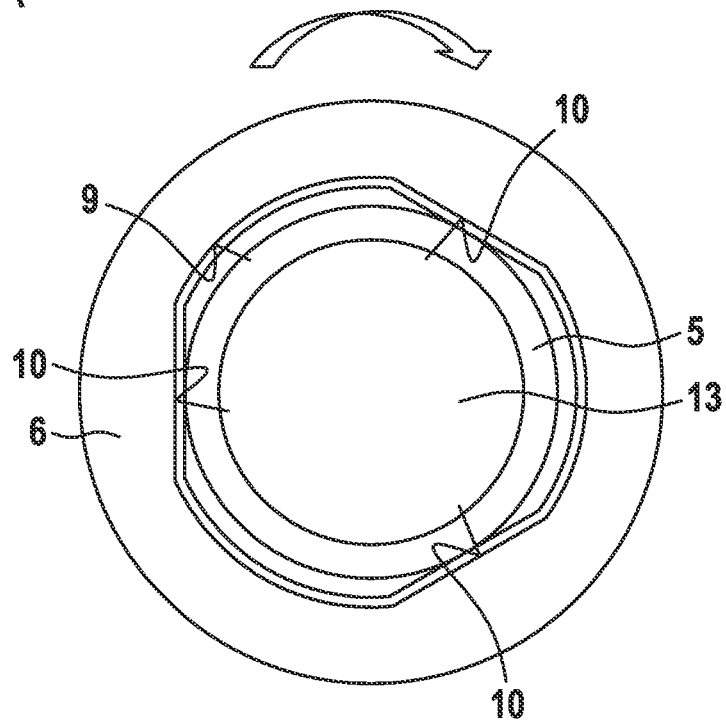
FIG. 6A shows a plan view of an objective and a holding element for an imager module according to an example embodiment of the present invention.
Figure 6B:
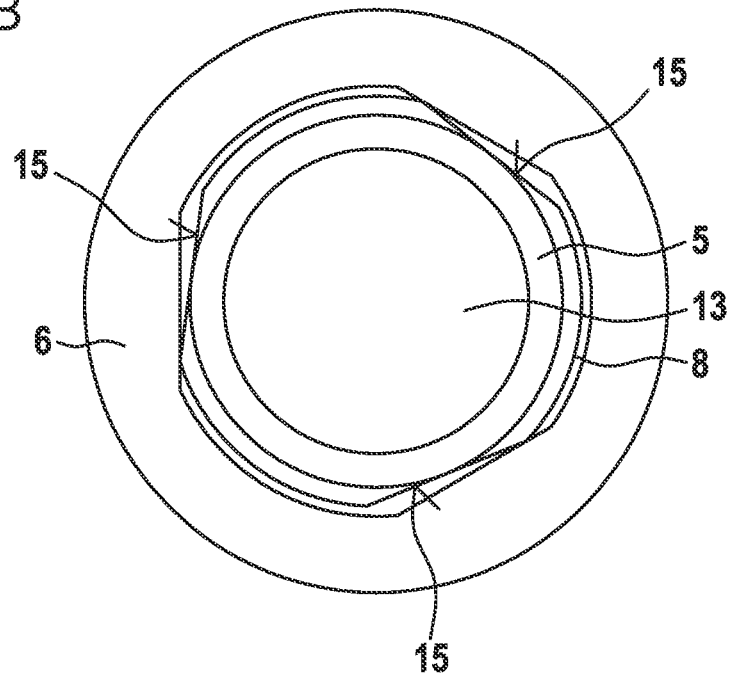
FIG. 6B shows a plan view of the objective and the holding element of FIG. 6A after a rotation of the parts relative to one another.
Figure 7A:
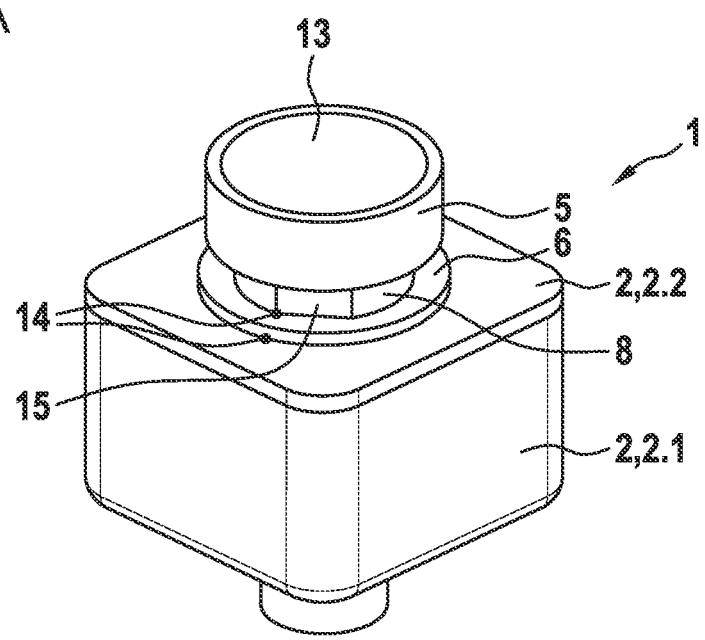
FIG. 7A shows a perspective view of an imager module according to a second preferred embodiment of the present invention.
Figure 7B:
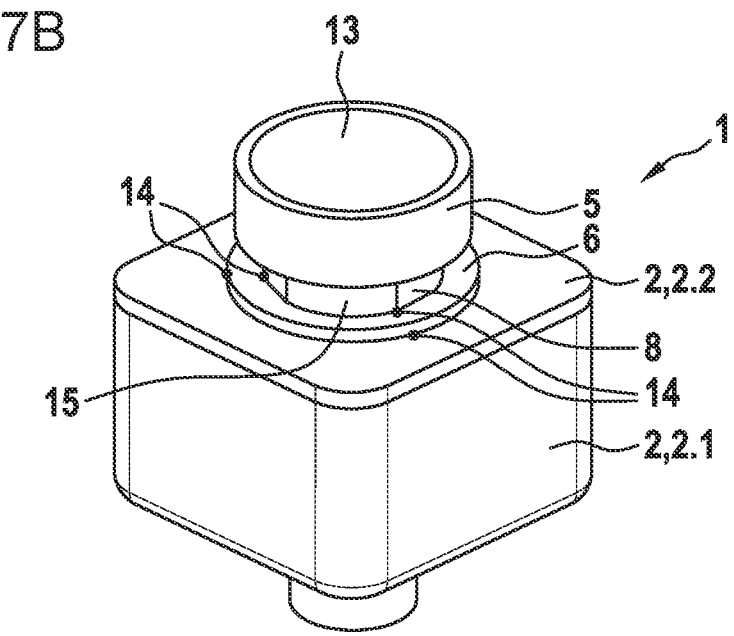
FIG. 7B shows a perspective view of the imager module of FIG. 7A, although after a rotation of the parts relative to one another.

A further, preferred embodiment of an imager module 1 according to the present invention can be found in the following figures. They show an objective 5 which has an outer contour 8 with flattened portions 15 in the region of the holding element 6. The holding element 6 has an inner contour 10 which is adapted to the outer contour 8 of the objective 5 (see FIG. 6A). For bridging larger gaps between the holding element 6 and the objective 5, the holding element 6 can be rotated to assume a changed angular position relative to the objective 5, so that better tolerance compensation is obtained (see FIG. 6B). In particular, this establishes contact points, in the region of which the welding spots 14 can then be created (see FIGS. 7A and 7B).

The invention claimed is:

1. An imager module for a camera or a sensor, comprising:
   a housing;
   a sensor carrier which is fixedly connected to the housing and on which an image sensor is arranged;
   an objective lens; and
   a holding element via which the objective lens is held and is aligned with respect to the image sensor, wherein the holding element is arranged outside the housing and bridges a radial gap between the objective lens and the housing, and wherein the holding element is welded to the objective lens and/or to the housing.

2. The imager module according to claim 1, wherein the housing is a multipart housing.

3. The imager module according to claim 1, wherein the holding element is spot-welded to the objective lens and/or to the housing.

4. The imager module according to claim 1, wherein the holding element is manufactured from metal.

5. The imager module according to claim 1, wherein the holding element is manufactured from sheet metal.

6. The imager module according to claim 1, wherein the objective lens has, at least in a portion surrounded by the holding element, a metal outer contour for welding to the holding element, wherein the metal outer contour has at least one flattened portion.

7. The imager module according to claim 1, wherein the holding element is configured as a ring or disk with a central hole for accommodating the objective lens, wherein the hole has an inner contour adapted to a outer contour of the objective lens.

8. The imager module according to claim 1, wherein the housing is at least partially manufactured from metal.

9. The imager module according to claim 1, wherein the housing includes at least a first housing part configured to accommodate the sensor carrier and the image sensor, and a second housing part configured as a cover, wherein the first housing part and the second housing part are connected in a firmly-bonded and/or positive manner.

10. The imager module according to claim 9, wherein the second housing part configured as a cover has a collar which delimits the radial gap and extends into the housing.

11. The imager module according to claim 9, further comprising a seal accommodated in the radial gap.

12. The imager module according to claim 1, wherein the objective lens has at least one optical lens.

13. The imager module according to claim 12, wherein the at least one lens is in the form of a lens package.

* * * * *